United States Patent
Aqeel et al.

(10) Patent No.: US 11,952,868 B2
(45) Date of Patent: Apr. 9, 2024

(54) METHODS FOR GENERATING SYNTHETIC PRODUCTION LOGS FOR PERFORATED INTERVALS OF A PLURALITY OF WELLS

(71) Applicant: Saudi Arabian Oil Company, Dhahran (SA)

(72) Inventors: Nauman Aqeel, Dhahran (SA); Waqas Ahmed Khan, Khobar (SA); Sualeh Hasan, Dhahran (SA); Khaled Benzaoui, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 548 days.

(21) Appl. No.: 17/160,725

(22) Filed: Jan. 28, 2021

(65) Prior Publication Data

US 2021/0310345 A1 Oct. 7, 2021

Related U.S. Application Data

(60) Provisional application No. 63/006,349, filed on Apr. 7, 2020.

(51) Int. Cl.
*E21B 41/00* (2006.01)
*E21B 43/25* (2006.01)
(Continued)

(52) U.S. Cl.
CPC .............. *E21B 41/00* (2013.01); *E21B 43/25* (2013.01); *E21B 47/10* (2013.01); *E21B 47/138* (2020.05);
(Continued)

(58) Field of Classification Search
CPC ........ E21B 41/00; E21B 47/138; E21B 43/25; E21B 47/10; E21B 2200/20; G06N 20/00; G06F 18/24; G06F 18/214; G01V 99/005
See application file for complete search history.

(56) References Cited

U.S. PATENT DOCUMENTS 6,374,185 B1   4/2002   Taner et al.
7,706,981 B2   4/2010   Wilkinson et al.
(Continued)

FOREIGN PATENT DOCUMENTS

WO   2020065365 A1   4/2020

OTHER PUBLICATIONS

International Search Report and Written Opinion dated Jul. 9, 2021 pertaining to International application No. PCT/US2021/025908 filed Apr. 6, 2021, 16 pages.
(Continued)

*Primary Examiner* — Kamini S Shah
*Assistant Examiner* — Edward P Picton
(74) *Attorney, Agent, or Firm* — DINSMORE & SHOHL LLP

(57) ABSTRACT

A method for predicting oil flow rates is provided. The method includes accessing historical data from a plurality of databases, accessing historical perforation data and historical reservoir properties data from a simulation model, and determining fluid flow values and rock quality index values associated with perforated intervals of the plurality of wells. The method further includes corresponding the fluid flow values and rock quality values to the well production data, training, using the plurality of input values, a machine learning model for predicting oil flow values at perforated intervals of a plurality of target wells, predicting, using the trained machine learning model, the oil flow values at the perforated intervals of the plurality of target wells, and generating a synthetic production log that includes the predicted oil flow values at the perforated intervals of the plurality of target wells.

20 Claims, 11 Drawing Sheets

(51) Int. Cl.
  *E21B 47/10* (2012.01)
  *E21B 47/12* (2012.01)
  *G01V 99/00* (2009.01)
  *G06F 18/214* (2023.01)
  *G06F 18/24* (2023.01)
  *G06N 20/00* (2019.01)

(52) U.S. Cl.
  CPC .......... *G01V 99/005* (2013.01); *G06F 18/214* (2023.01); *G06F 18/24* (2023.01); *G06N 20/00* (2019.01); *E21B 2200/20* (2020.05)

(56) References Cited

U.S. PATENT DOCUMENTS

| | | | |
|---|---|---|---|
| 8,374,974 B2 | 2/2013 | Chen et al. | |
| 10,242,312 B2 | 3/2019 | Storm, Jr. | |
| 2011/0297370 A1* | 12/2011 | Michael | E21B 43/14 |
| | | | 702/6 |
| 2014/0025301 A1 | 1/2014 | Storm, Jr. et al. | |
| 2014/0288909 A1 | 9/2014 | Prestwood et al. | |
| 2018/0010429 A1* | 1/2018 | Willberg | E21B 41/0092 |
| 2020/0124753 A1* | 4/2020 | Halsey | G06F 30/20 |

OTHER PUBLICATIONS

Akinnikawe et al., "Synthetic Well Log Generation Using Machine Learning Techniques", UNC Inventional Resources Technology Conference, https://www.onepetro.org/conference-paper/URTEC-2877021-MS, Jul. 23-25, 2018.

Zhang et al., "Synthetic well logs generation via Recurrent Neural Networks", Petroleum Exploration and Development, vol. 45, Issue 4, pp. 629-639, Aug. 2018.

* cited by examiner

US 11,952,868 B2

METHODS FOR GENERATING SYNTHETIC PRODUCTION LOGS FOR PERFORATED INTERVALS OF A PLURALITY OF WELLS

CROSS REFERENCE

This application claims priority to U.S. Provisional Application Ser. No. 63/006,349, filed on Apr. 7, 2020.

TECHNICAL FIELD

The present disclosure relates to methods for generating a synthetic production log, and more particularly, to generating a synthetic production log that includes predicted oil flow values that are associated with perforated intervals included in each well of a plurality of wells that may be installed in one or more reservoirs.

BACKGROUND

One of the biggest challenges the oil and gas industry faces today is accurately determining the productivity level and productivity potential of oil wells downhole at reservoir level. Conventionally, such downhole measurements are obtained with production logging tools (PLTs) such as Spinner flow-meters. Such tools are run either through slickline, electric line, or other conveyance methods that require well interventions that may not be an operationally or economically viable option at all times. Accordingly, there is a need to determine productivity levels of oil wells downhole at reservoir level without relying exclusively on the expensive and time consuming practice of using production logging tools.

SUMMARY

In one aspect, a method for predicting, using a machine learning trained model, oil flow values at perforated intervals of a plurality of target wells is provided. The method, which may be implemented by one or more computing devices, includes accessing historical data from a plurality of databases, the historical data including well production data of a plurality of wells, well completions data, flow meters data, and well rate tests data, accessing historical perforation data and historical reservoir properties data from a simulation model, determining, using the historical perforated interval data and the historical reservoir properties data from the simulation model, fluid flow values and rock quality index values associated with perforated intervals of the plurality of wells, and corresponding the fluid flow values and rock quality values to the well production data included in the historical data of the plurality of wells for generating a plurality of input values. The method further includes training, using the generated plurality of input values, a machine learning model for predicting oil flow values at perforated intervals of a plurality of target wells, predicting, using the trained machine learning model, the oil flow values at the perforated intervals of the plurality of target wells, and generating a synthetic production log that includes the predicted oil flow values at the perforated intervals of the plurality of target wells.

In another aspect, a non-transitory computer-readable medium storing instructions is provided. These instructions, when executed by one or more processors of a computing device, cause the computing device to access historical data from a plurality of databases, the historical data including well production data of a plurality of wells, well completions data, flow meters data, and well rate tests data, access historical perforation data and historical reservoir properties data from a simulation model, and determine, using the historical perforated interval data and the historical reservoir properties data from the simulation model, fluid flow values and rock quality index values associated with perforated intervals of the plurality of wells. These instructions, when executed by one or more processors of a computing device, further cause the computing device to correspond the fluid flow values and rock quality values to the well production data included in the historical data of the plurality of wells for generating a plurality of input values, train, using the generated plurality of input values, a machine learning model for predicting oil flow values at perforated intervals of a plurality of target wells, predict, using the trained machine learning model, the oil flow values at the perforated intervals of the plurality of target wells, and generate a synthetic production log that includes the predicted oil flow values at the perforated intervals of the plurality of target wells.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and example in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As stated, conventional techniques of determining productivity levels of oil wells rely almost exclusively on production logging tools, e.g., spinner flow meters. These tools are used to capture downhole data at reservoir level data related to oil flow, water flow, and so forth associated with a plurality of wells. However, the running of such production logging tools (PLTs) require well interventions that may not be an operationally or economically viable option at all times. In addition, running of such tools in wells having certain shapes and dimensions (e.g., horizontal wells) presents various operational challenges. Accordingly, there is a need to determine productivity levels of oil wells without relying exclusively on the expensive and time consuming practice of using production logging tools.

Embodiments of the present disclosure address and overcome these limitations. Specifically, the present disclosure is directed to methods for generating, using a machine learning trained model, a synthetic production log that includes a plurality of oil flow values associated with perforated intervals of a plurality of wells. These predicted oil flow values, when compared to actual production data associated with these perforated intervals (e.g., obtained via various flow meters), are highly accurate, and as such, provide a cost effective and accurate estimate of downhole productivity levels of these wells. It is further noted that the machine learning trained model that is utilized to predict the oil flow values at perforated intervals of the plurality of wells complements the fluid flow physics, e.g., the measurements and/or assessments of the direction and orientation of the flow of oil and water in and around the reservoirs associated with the plurality of wells.

Figure 1:
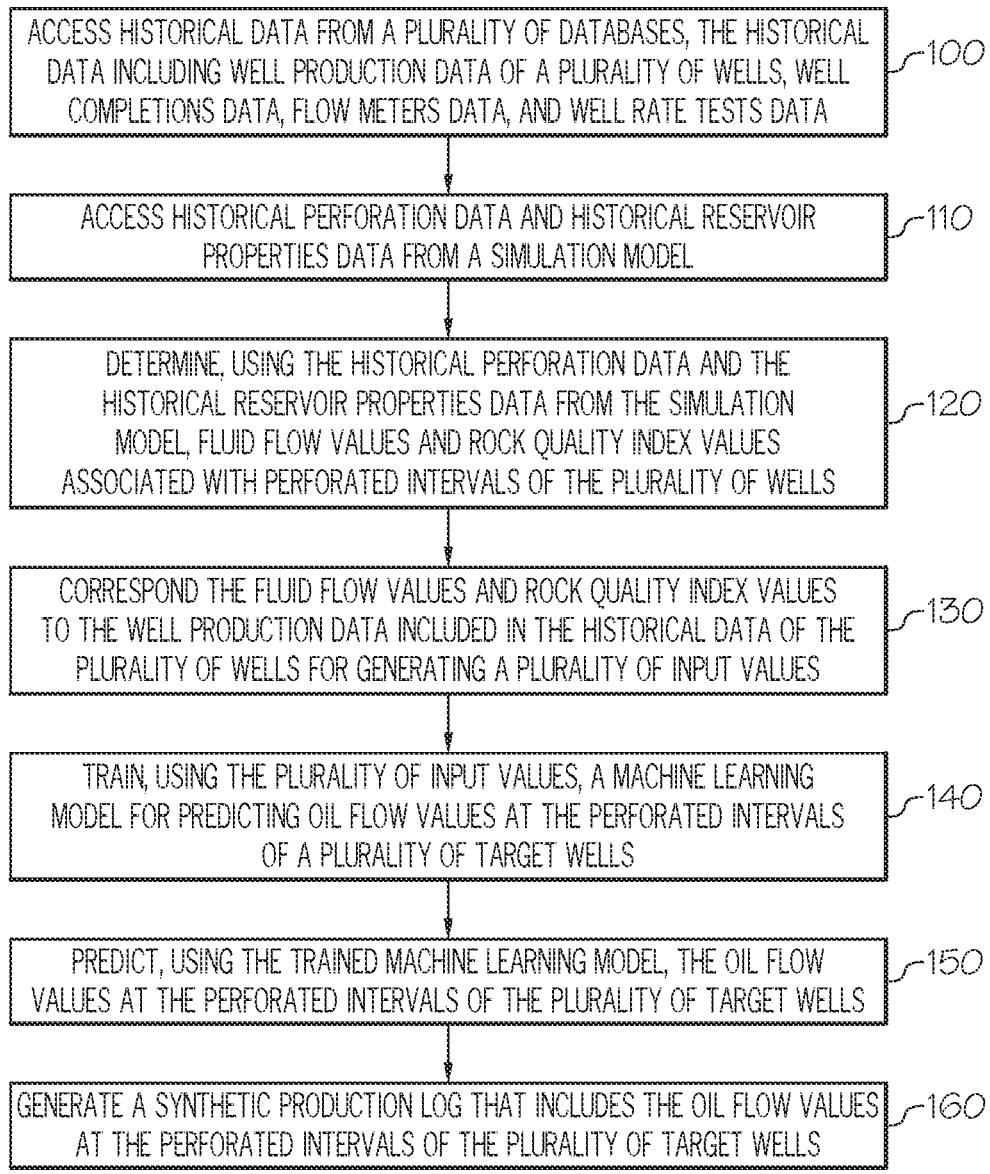
FIG. 1 depicts a flowchart of an example system described herein that is configured to generate a synthetic production log that is configured to predict oil flow values for perforated intervals of a plurality of wells, according to one or more embodiments described and illustrated herein.

FIG. 1 depicts a flowchart of an example system described herein that is configured to generate a synthetic production log that is configured to predict oil flow values for perforated intervals of a plurality of wells, according to one or more embodiments described and illustrated herein. A discussion of FIGS. 2-8 will be interspersed with the discussion of FIG. 1 (among other Figures).

In step 100, a computing device 104 (depicted in FIG. 8, but not shown in FIG. 1) may access historical data from a plurality of databases, the historical data including well production data of a plurality of wells (e.g., a first plurality of wells). The historical data may also include well completions data, flow meters data, and well rate tests data. The well production data relates to a plurality of properties of one or more wells that are currently operational or were previously operational in an oil field. Broadly speaking, these properties relate to the nature and behavior of fluids in and around a borehole during production and operation of a well. In embodiments, such data may include flow meters data that is obtained by the use of flow meters that are installed at various depth levels associated with the plurality of wells. For example, production data may relate to flowing well head pressure (FWHP) values, water cut percentage, top depth and bottom depth of an interval, liquid and oil flow values (e.g., rates) at an interval, water cut percentage at an interval, water flow values (e.g., rates) at an interval, water flow rate as a whole at a well, and so forth. The plurality of databases could also include the name of the reservoir in which the plurality of wells were located, the total number of wells in the field, and so forth. It is noted that these properties are non-exhaustive.

Well completion is a process of preparing a well for extraction of oil. This process includes a variety of steps that, when performed, result in transforming a drilled well into a producing well. These steps involve, without limitation, casing, cementing, perforating, gravel packing, and so forth. In embodiments, the data related to well completion may describe the length of the well, and the dimensions of various components involved in well completion, e.g., the conductor pipe, surface casing, intermediate casing, production casing, and so forth. Data related to other properties and steps involved are also contemplated.

Well rate tests data relate to flow capacities of wells under specific conditions of the reservoirs in which these wells are to be installed. In particular, the well rate tests data includes data describing the name of the reservoir in which the plurality of wells are located, and the surface flow rate measurements such as the total liquid flow rates, oil flow rates, gas to oil ratio, choke size, flow well head pressure values, and so forth. Alternatively or additionally, in embodiments, data related to changes in the fluid or rock properties may also be analyzed, tracked, and included as part of this data. It is also noted that well rate tests may be conducted across each of the plurality of wells at different time periods, e.g., monthly, semiannually, annually, and so forth. Data related to various other properties of the plurality of wells are also contemplated as being included in the well rate tests data.

In step 110, the computing device 104 may access historical perforation data and historical reservoir properties data from a simulation model. In embodiments, the simulation model may be a dynamic two-dimensional or three-dimensional simulation model that corresponds to a reservoir model. The simulation model be a reservoir simulation model that is generated, by the computing device 104, using a plurality of data related to the plurality of wells. In embodiments, the reservoir model may include data associated with perforated intervals included in each of the plurality of wells. In embodiments, the intervals may correspond to specific depth levels measured from a particular surface level of each of the plurality of wells. Moreover, each interval may have a dimension of its own. As a non-limiting example, one or more wells may have intervals located at every meter from the surface of the well to the deepest portion of the well. Each of these intervals may have a corresponding perforation, which is an aperture of a certain dimension that is created on a surface of a casing of a well. This perforation facilitates the extraction of liquids (e.g., water, oil, and so forth) from a reservoir. In practice, one or more perforations having a certain dimension may be included in each of the intervals located at every meter, for example. As such, each interval of a well that has a perforation may be referred to as a perforated interval. Each interval has its own fluid flow rates, characteristics, and so forth. It is noted that the perforated intervals are associated with a plurality of depth levels (e.g., a plurality of depth values) such that each perforated interval is associated with a depth level (e.g., a distinct or particular depth value).

The reservoir simulation model may also be based on one or more porosity values, permeability values, well geometry, rock classifications, and stratigraphic zone values. In other words, the historical reservoir properties data that is accessed from the reservoir simulation model may be associated with one or more porosity values, permeability values, well geometry, rock classifications, stratigraphic zone values, etc. In embodiments, the model may incorporate distinct porosity and permeability values corresponding to each interval such that a comprehensive analysis of the historical reservoir properties surrounding the well (e.g., at each foot or meter) may be determined. The reservoir model also incorporates the well geometry of each well, e.g., inclination angles of the well at each interval, the trajectory of the well at each interval and the overall trajectory, and the overall well trajectory. Additionally, rock classification data and stratigraphic zone values may be tracked and stored such that the composition of the reservoir at each interval of each of the plurality of wells may be determined. For example, the model may aid in determining that multiple intervals of the reservoir share the same or substantially similar properties, age, composition, and so forth (i.e., are part of the same stratigraphic unit), or two adjacent intervals have very different compositions (i.e., are part of different stratigraphic units).

In embodiments, the various types of data described above, which are used to generate the reservoir model, may be captured in the form of raw data having distinct data formats. The computing device 104 may convert and store all of the data (which may be stored in varying data formats) into a unified data file. This unified file may be more effectively analyzed.

Figure 2:
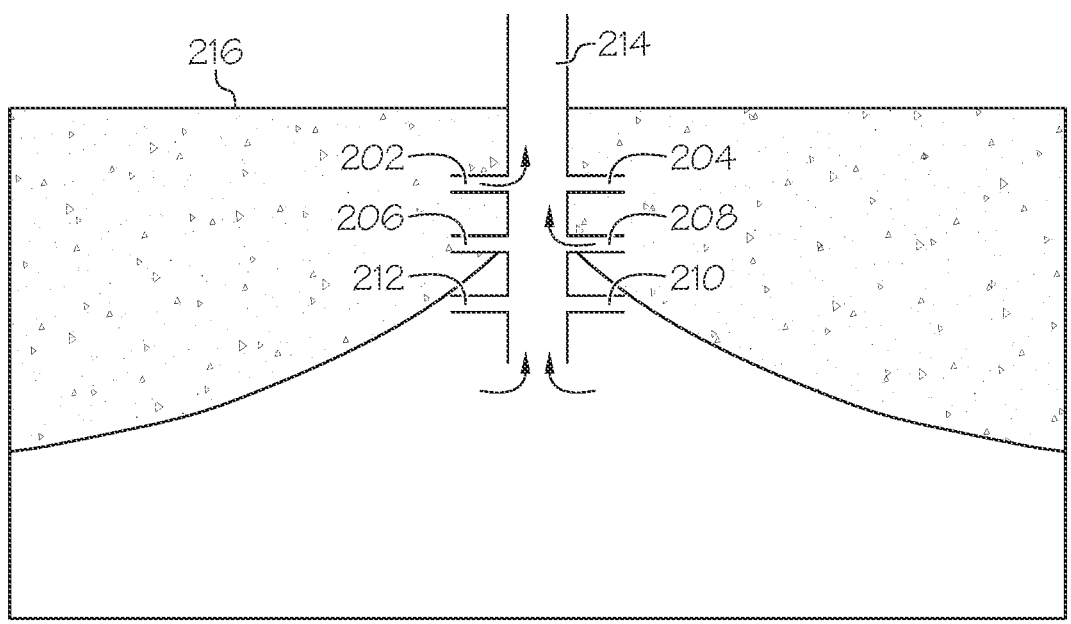
FIG. 2 depicts an example well from the plurality of wells with perforations at select intervals, according to one or more embodiments described and illustrated herein.

FIG. 2 depicts an example well 214 from the plurality of wells with perforations at select intervals, according to one or more embodiments described and illustrated herein. As depicted, perforations are located at certain intervals that correspond to various depth levels ranging from the areas near the surface of the well to the deepest portion of the well. As such, these intervals may be perforated intervals 202, 204, 206, 208, 210, and 212. As depicted, the example well 214 is installed in a reservoir 216 that includes deposits of water and oil. The reservoir model may be utilized to effectively analyze the properties of the reservoir 216 in the areas surrounding the perforated intervals 202, 204, 206, 208, 210, and 212, namely the areas that have oil deposits and water deposits. In particular, the composition of the reservoir 216 in these areas and in areas where the deposits change from predominantly oil to predominantly water (e.g., areas of transition) may also be determined using the reservoir model. In this way, the capability of the system to determine well productivity (e.g., estimates of the oil that can be extracted from the reservoir within a defined time frame) is improved, at least in part, due to a comprehensive understanding of reservoir properties. It is noted that while the example well 214 is shown to include a largely straight trajectory, wells having curved trajectories, geometries, and orientations are also contemplated.

In step 120, the computing device 104 may determine, using historical perforation data and historical reservoir properties data from the simulation model, fluid flow values and rock quality values associated with the perforated intervals of the plurality of wells.

In particular, the computing device 104 may access or extract a plurality of data logs (e.g., Reservoir Model Logs) from the reservoir model for each interval of a plurality of intervals of the plurality of wells (e.g., a first plurality of wells). These data logs may include the historical perforation data and reservoir properties data as described above, e.g., porosity values, permeability values, well geometry, rock classifications, and stratigraphic zone values. By analyzing this data, the computing device 104 may determine fluid flow values and rock quality values. The analysis is based on the following algorithms:

$$KH(mD \cdot Ft) = K \times H \qquad (1)$$

$$(2) RQI = 0.0314 \sqrt{\frac{K}{\phi}}$$

In the first algorithm (1), a flow potential or flow capacity for each interval of a well may be determined by the computing device 104 by performing a product of a permeability value (the term "K") and a thickness value (the term "H"). As previously stated, in embodiments, each well of the plurality of wells may have numerous intervals and each interval may correspond with a depth level and have a certain dimension. The dimension (e.g., vertical measurement) of the interval corresponds to the thickness of the well. Example thicknesses of the perforated intervals are depicted in FIG. 3.

Figure 3:
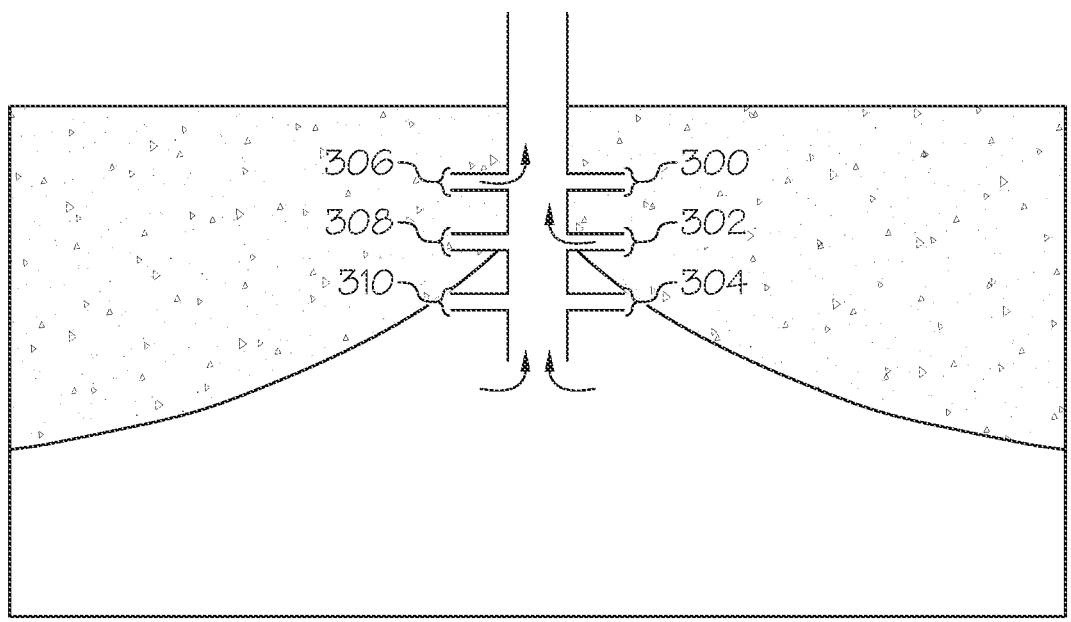
FIG. 3 schematically depicts an example well from the plurality of wells that has a plurality of perforations at select intervals, with indications of the thicknesses of these intervals, according to one or more embodiments described and illustrated herein.

FIG. 3 schematically depicts an example well from the plurality of wells (e.g., a first plurality of wells) that has a plurality of perforations at select intervals, with indications of the thicknesses of these intervals, according to one or more embodiments described and illustrated herein. As depicted, perforated intervals 202, 204, 206, 208, 210, and 212 (depicted in FIG. 2) may correspond with thickness values 300, 302, 304, 306, 308, 310. While the thickness values in FIG. 3 are shown to be largely equal, it is noted that in other embodiments, the thicknesses of the perforated intervals may vary.

Next, in the second algorithm (2), a plurality of rock quality values may also be calculated for each interval. In particular, a rock quality value may be determined for each interval by dividing a permeability value (the term "K") of the interval by a porosity value (the term "0") for the same, determining a square root of the result, and multiplying this result by the value of 0.0314. It is noted that determining such rock quality values facilitates a better understanding of the composition of the reservoir at each interval, which in turn helps anticipate and analyze the overall well productivity capabilities of the well.

In step 130, the computing device 104 may correspond the fluid flow values and rock quality values (determined in step 120) to the well production data included in the historical data of the plurality of wells for the purpose of generating a plurality of input values. These input values form a dataset upon which a machine learning model is trained.

Figure 4A:
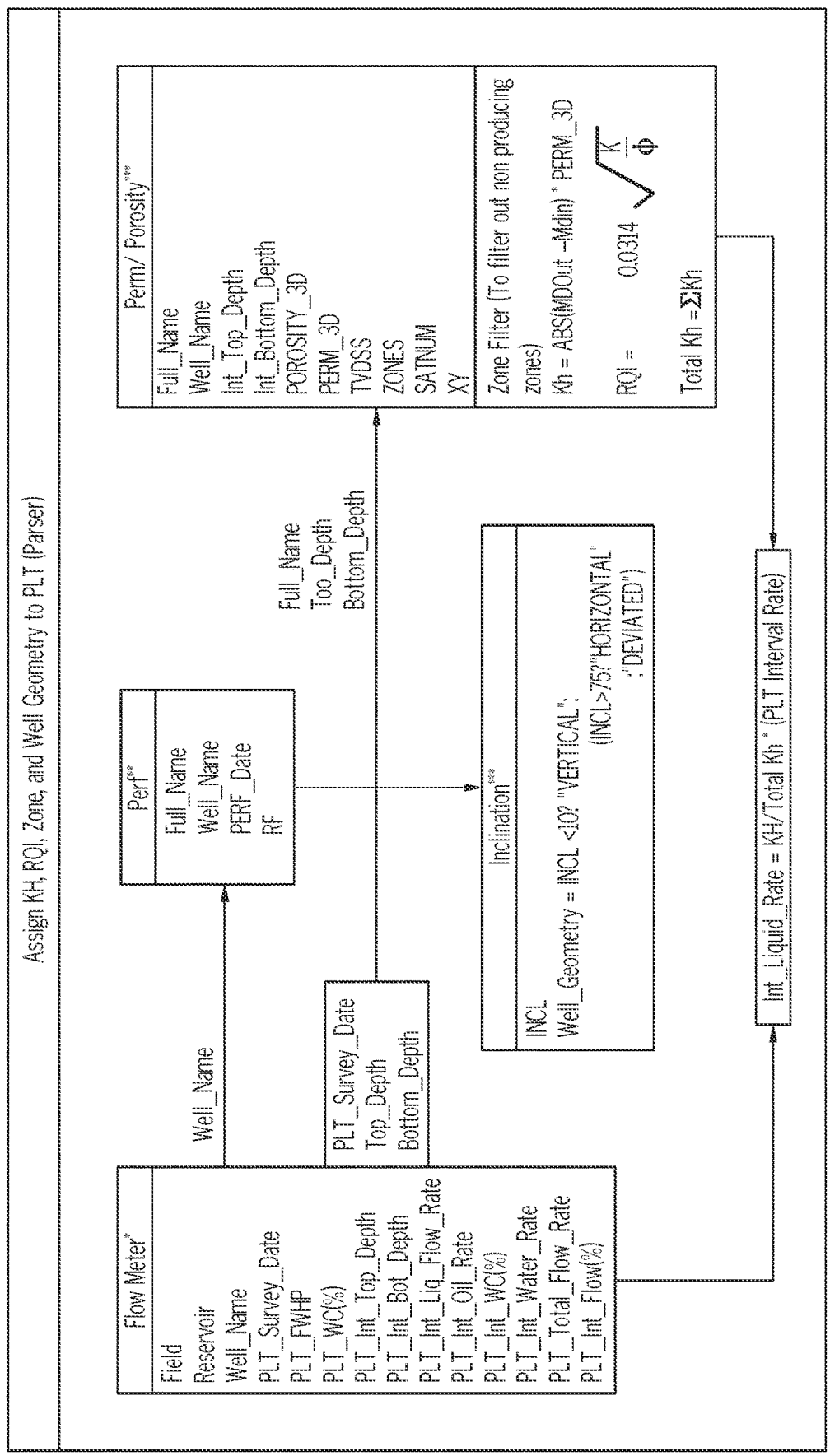
FIG. 4A depicts an example graphical representation showing steps for preparing subsurface data for training the machine learning model, namely linkages between the fluid flow values and rock quality values and well production data included in the historical data of the plurality of wells, according to one or more embodiments described and illustrated herein.

FIG. 4A depicts an example graphical representation showing steps for preparing subsurface data for training the machine learning model, namely linkages between the fluid flow values and rock quality values and well production data included in the historical data of the plurality of wells, according to one or more embodiments described and illustrated herein.

As depicted, the data provided underneath the section of the graphical representation titled "Flow Meter" includes all of historical data (e.g., well production data, well completions data, flow meters data, and well rate tests data) of each well of the plurality of wells, as described above. The data included under the section titled "Flow Meter" may be obtained from a single database, or may be gathered and stored in a plurality of separate databases that may be coupled such that data from each of these databases may be easily transferred, shared, and accessed. Additionally, historical perforated interval data and historical reservoir properties data are each obtained from a simulation model and/or a three-dimensional reservoir model.

As depicted, the fluid flow values and rock quality values (determined in step 120) are linked to or correspond with the well production data included in the historical data of the plurality of wells. In particular, corresponding the fluid flow values and rock quality values to the well production data includes linking fluid flow values (e.g., liquid flow rate, oil flow rate, water rate, and so forth) with a particular perforated interval and the porosity and permeability values associated with areas of the reservoir that are adjacent to or within a certain proximity of the perforated interval. As shown, fluid flow values (e.g., oil rate, water rate) and rock quality values (e.g., porosity values, permeability value, well geometry, rock types, stratigraphic zones, and so forth) are linked via arrows that associate each of the sections labeled "Flow Meter" "Perf", "Inclination*", and "Perm/Porosity**". Thereafter, upon completion of the corresponding step, a plurality of input values may be generated by the computing device 104. These input values serve as a training data set upon which a model may be trained, e.g., using machine learning. It is further noted that the computing device 104 performs multiple steps to prepare the input values as the data set (e.g., the data set including subsurface data) that is then input into a machine learning model. Specifically, the input values include data that is saved and stored in various data types and obtained at different time periods, frequencies, and so forth. These input values are converted and incorporated into one file. Thereafter, the historical data of the plurality of wells is organized and allocated so as to match the porosity and permeability values.

Figure 4B:
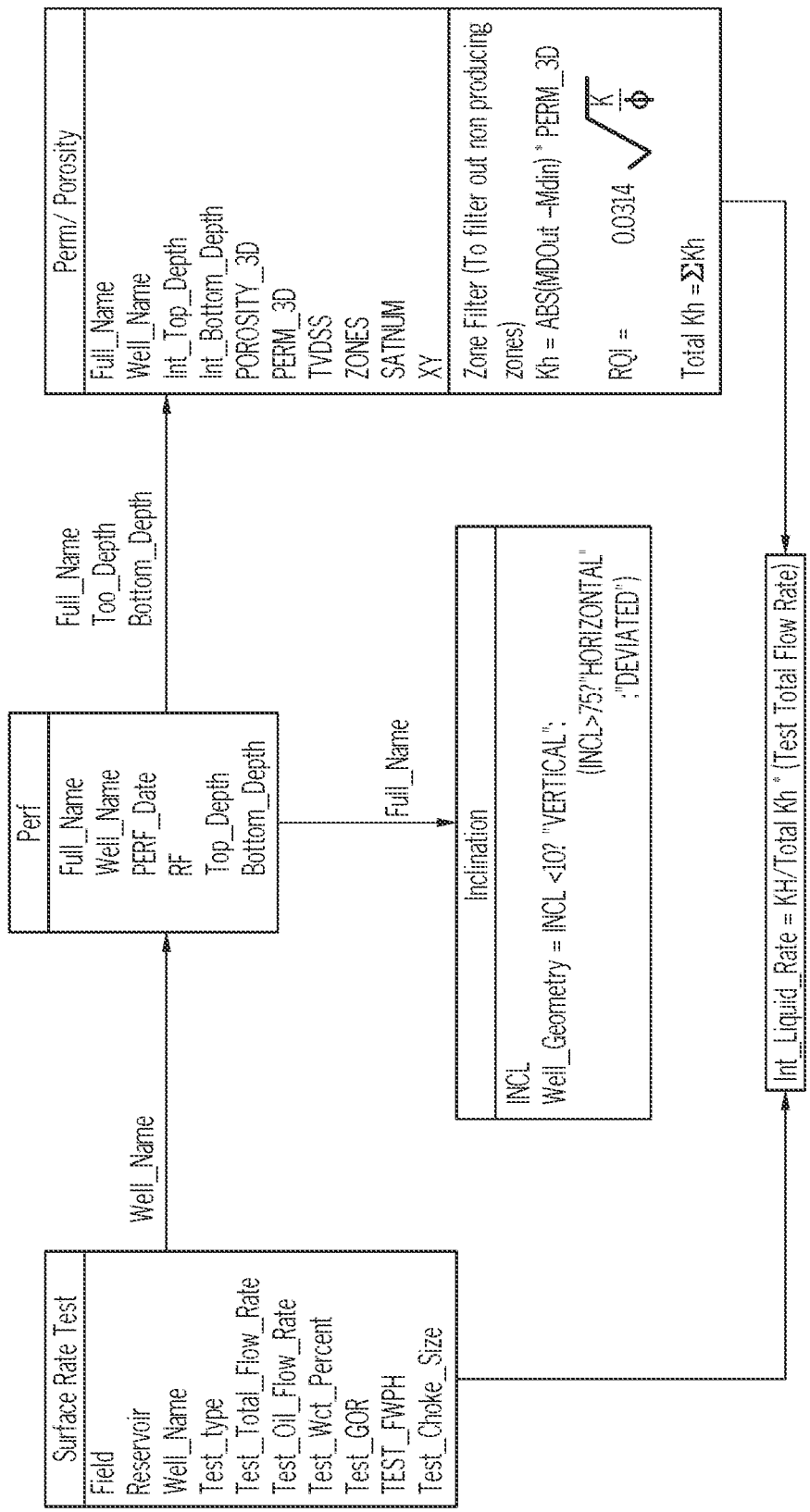
FIG. 4B depicts an example graphical representation showing steps for preparing surface rate test data for predicting oil flow rates using a machine learning model that is trained on subsurface rate tests data, according to one or more embodiments described and illustrated herein.

FIG. 4B depicts an example graphical representation showing steps for preparing surface rate test data for predicting oil flow rates using a machine learning model that is trained on subsurface rate tests data (e.g., Actual Production Logging Tool (PLT) Surveys), according to one or more embodiments described and illustrated herein.

As depicted, the data provided underneath the section of the graphical representation titled "Surface Rate Test" includes various types of data (e.g., well production data, well completions data, flow meters data, and well rate tests data) for each well of the plurality of wells, as described above. The data included under the section titled "Surface Rate Test" may be obtained from a single database, or may be gathered and stored in a plurality of separate databases that may be coupled such that data from each of these databases may be easily transferred, shared, and accessed. Additionally, historical perforated interval data and historical reservoir properties data are each obtained from a simulation model and/or a three-dimensional reservoir model. In embodiments the types of data included under the "Surface Rate Test" section includes data related to a particular reservoir, the name of the well, the type of test conducted, total flow rate, oil flow rate, water percentage, and so forth.

Additionally, in embodiments, as depicted in FIG. 4B, the fluid flow values and rock quality values (determined in step 120) are linked to or corresponded with the well production data included in the historical data of the plurality of wells. In particular, corresponding the fluid flow values and rock quality values to the well production data includes linking data related to a particular reservoir, the name of the well, the type of test conducted, total flow rate, oil flow rate, water percentage, and so forth (as shown under the section titled "Surface Rate Test") with a particular perforated interval and the porosity and permeability values associated with areas of the reservoir that are adjacent to or within a certain proximity of the perforated interval. As shown, fluid flow values (e.g., oil rate, water rate) and rock quality values (e.g., porosity values, permeability value, well geometry, rock types, stratigraphic zones, and so forth) are linked via arrows that associate each of the sections labeled "Surface Rate Test" "Perf", "Inclination*", and "Perm/Porosity**". Thereafter, upon completion of the corresponding step, a plurality of input values may be generated by the computing device 104. These input values serve as a training data set upon which a model may be trained, e.g., using machine learning. It is further noted that the computing device 104 performs multiple steps to prepare the input values as the data set (e.g., surface rate test data) that is then input into a machine learning model. Specifically, the input values include data that is saved and stored in various data types and obtained at different time periods, frequencies, and so forth. These input values are converted and incorporated into one file. Thereafter, the historical data of the plurality of wells is organized and allocated so as to match the porosity and permeability values. The manner in which the model is trained using machine learning is further described in step 140.

In step 140, the computing device 104 may train, using the generated plurality of input values in step 130, a machine learning model for predicting oil flow values at perforated intervals of a plurality of target wells. It is further noted that the machine learning model is also trained on historical production logging tool (PLT) surveys. The model may be trained on one or more machine learning algorithms, such as, without limitation, a GBM algorithm, a random forest algorithm, a tree ensemble algorithm, and XGBoost algorithm. In embodiments, the machine learning based training of the model includes partitioning the data set (e.g. input values as described above) into a training data set and a testing data set. In embodiments, the training data set may include well production data, well completions data, flow meters data, and well rate tests data related to a subset (e.g., 70 wells) of the plurality of wells (e.g., total of 100 wells). It is noted that the plurality of wells may be installed in one or more reservoirs of a first example oil field (e.g., Field 1). The training data set may also include historical perforated interval data and historical reservoir properties data related to the subset (e.g., 70 wells), and a corresponding of the historical perforated interval data and historical reservoir properties data to the plurality of wells (the discussion related to FIG. 4 provides a more detailed explanation of this process). The machine learning model is robustly trained on this training data such that the model is configured to predict (for the surface rate test) oil flow values (e.g., oil flow rates) at perforated intervals of, e.g., a different plurality of wells.

The model is also trained such that it is configured to predict the oil flow values (e.g., oil flow rates) based on the characteristics of the well, e.g., vertical well, horizontal well, and so forth. It is noted that the accuracy of the machine learning trained model may vary depending on the quality of the data and the size of the data set that is used for training the model.

Upon completion of the training of the model, a second subset (e.g., the remaining 30 wells) of the plurality of wells (e.g., having a total of 100 wells) may serve as test data for the purposes of determining the accuracy of the model. To determine the accuracy of the model, reservoir properties data and perforated interval data related to the different subset (e.g., the remaining 30 wells) may be input, via the computing device 104, into the machine learning trained model. The model then outputs a plurality of oil flow values associated with the perforated intervals of the wells included in the second subset (e.g., remaining 30 wells). Specifically, in embodiments, each perforated interval of each well in the second subset may have a corresponding oil flow value. Alternatively, in embodiments, multiple one of the perforated intervals may have the same oil flow rate. The predicted oil rates are then compared to the actual oil flow values (e.g., oil flow rates) of the perforated intervals that are obtained using various sensors, e.g., flow meters, and other such components. Specifically, as all production data (e.g., well production data, well completions data, flow meters data, and well test rates data), is accessible and available for the plurality of wells, assessing the accuracy of the machine learning trained model is feasible. The accuracy of the machine learning trained model is described in further detail in FIGS. 5 and 6.

Figure 4C:
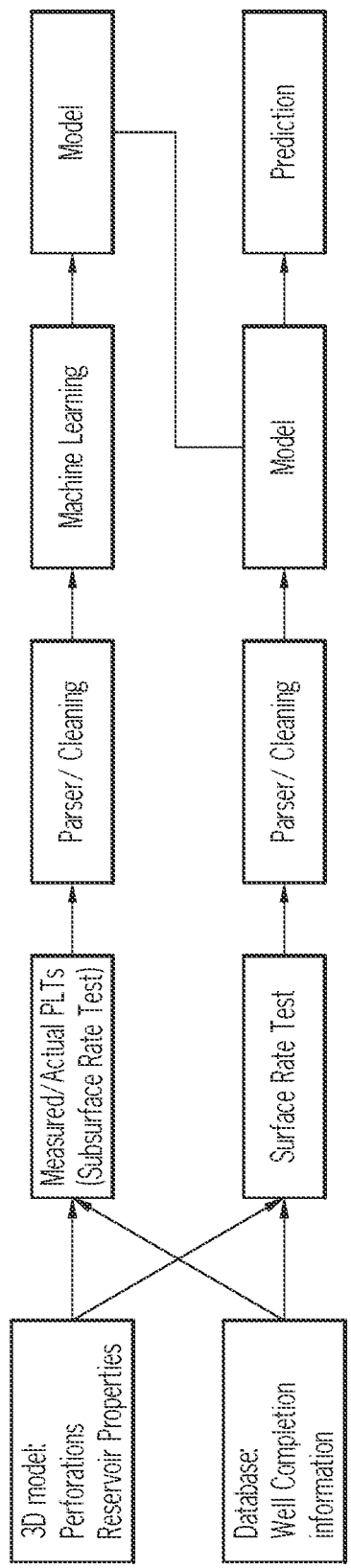
FIG. 4C depicts a simplified workflow schematic for training a machine learning model for predicting oil flow rates and utilizing the machine learning trained model to perform predictions of oil flow rates at perforated intervals of a plurality of target wells, according to one or more embodiments described and illustrated herein.

FIG. 4C depicts a simplified workflow schematic for training a machine learning model for predicting oil flow rates and utilizing the machine learning trained model to perform predictions of oil flow rates at perforated intervals of a plurality of target wells, according to one or more embodiments described and illustrated herein.

As depicted, FIG. 4C shows data preparation of reservoir properties associated with various perforations (e.g., associated with a plurality of wells) and well completion information (i.e. well completions data). Specifically, subsequent to preparing the data as described in FIGS. 4A and 4B above (e.g., preparing subsurface data as described in FIG. 4A and surface rate test data as described in FIG. 4B), both the subsurface data and surface rate test data undergoes parsing and cleaning processes. In embodiments, such cleaning of the data may include detecting and correcting corrupt or inaccurate records from a record set, table, or database, deleting inaccurate or partially accurate data, and so forth. Additionally, in embodiments, parsing data may include detection of, e.g., syntax errors. Thereafter, the cleaned data is utilized to train the machine learning trained model to predict oil flow rates at perforated intervals of a plurality of target wells, as described and illustrated in the present disclosure.

Figure 5:
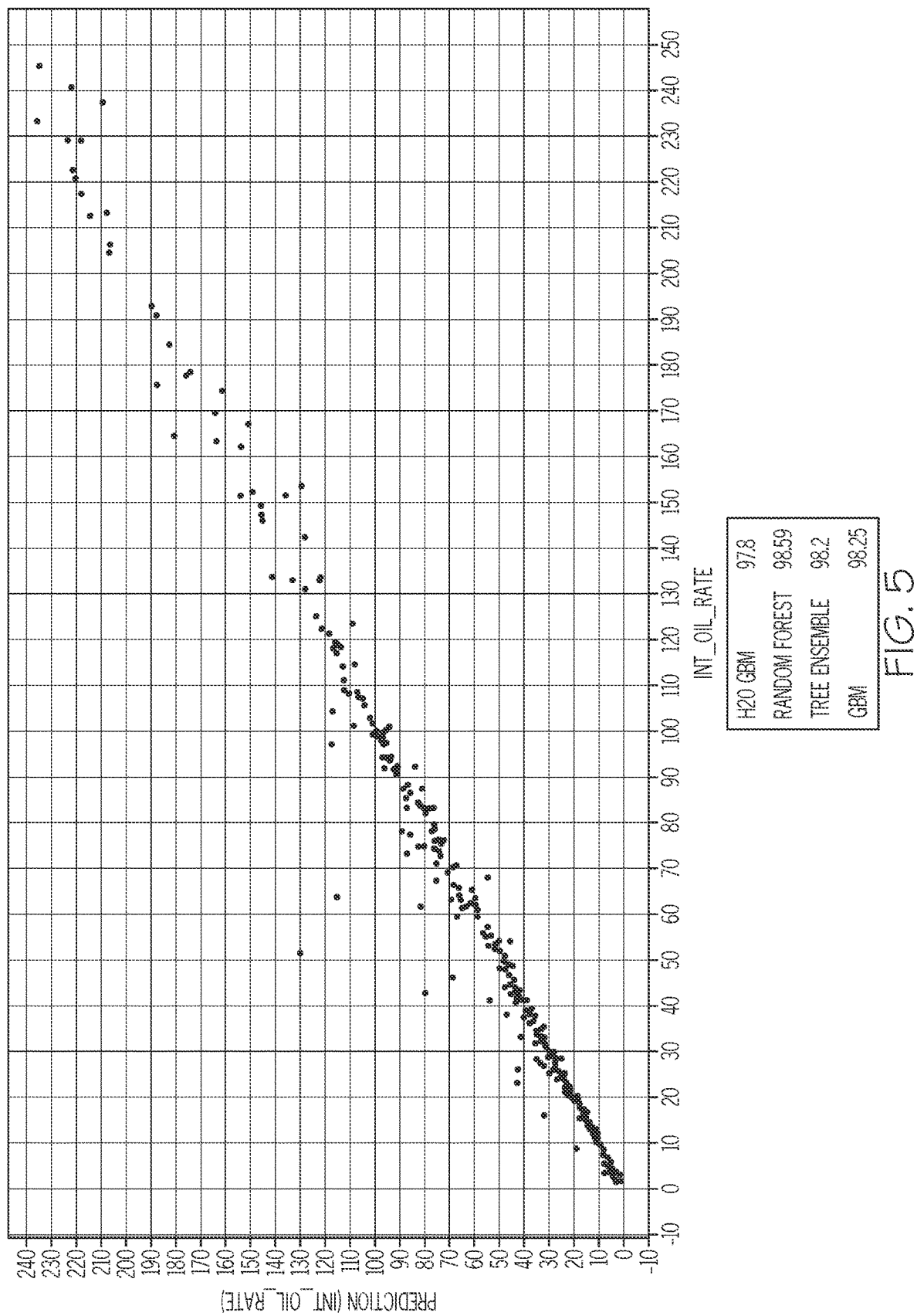
FIG. 5 schematically depicts a graphical representation of actual oil rates and predicted oil rates at perforated intervals of the an example subset of an example plurality of horizontal or deviated wells, according to one or more embodiments described and illustrated herein.

FIG. 5 schematically depicts a graphical representation of actual oil rates and predicted oil rates at perforated intervals of an example subset of an example plurality of horizontal or deviated wells, according to one or more embodiments described and illustrated herein. In particular, the graphical representation depicted in FIG. 5 plots actual oil flow values (e.g., flow rates) of horizontal or deviated wells on the x-axis and predicted oil flow values of the same wells on the y-axis. As previously stated, the model may be trained on various machine learning algorithms (e.g., H2O GBM, Random Forest, Tree Ensemble, and GBM). As shown, the accuracy of the trained model is fairly high, ranging from 97.8% to 98.59%. When trained on the H2O GBM algorithm, the model has the lowest accuracy level, e.g., an accuracy level in the range of approximately 97.8%. When trained on the Random Forest algorithm, the model has the highest accuracy level, e.g., in the range of approximately 98.59%. Training the model on the Tree Ensemble and GBM algorithms provides accuracy levels in the range of 98.2% to 98.28%, respectively.

Figure 6:
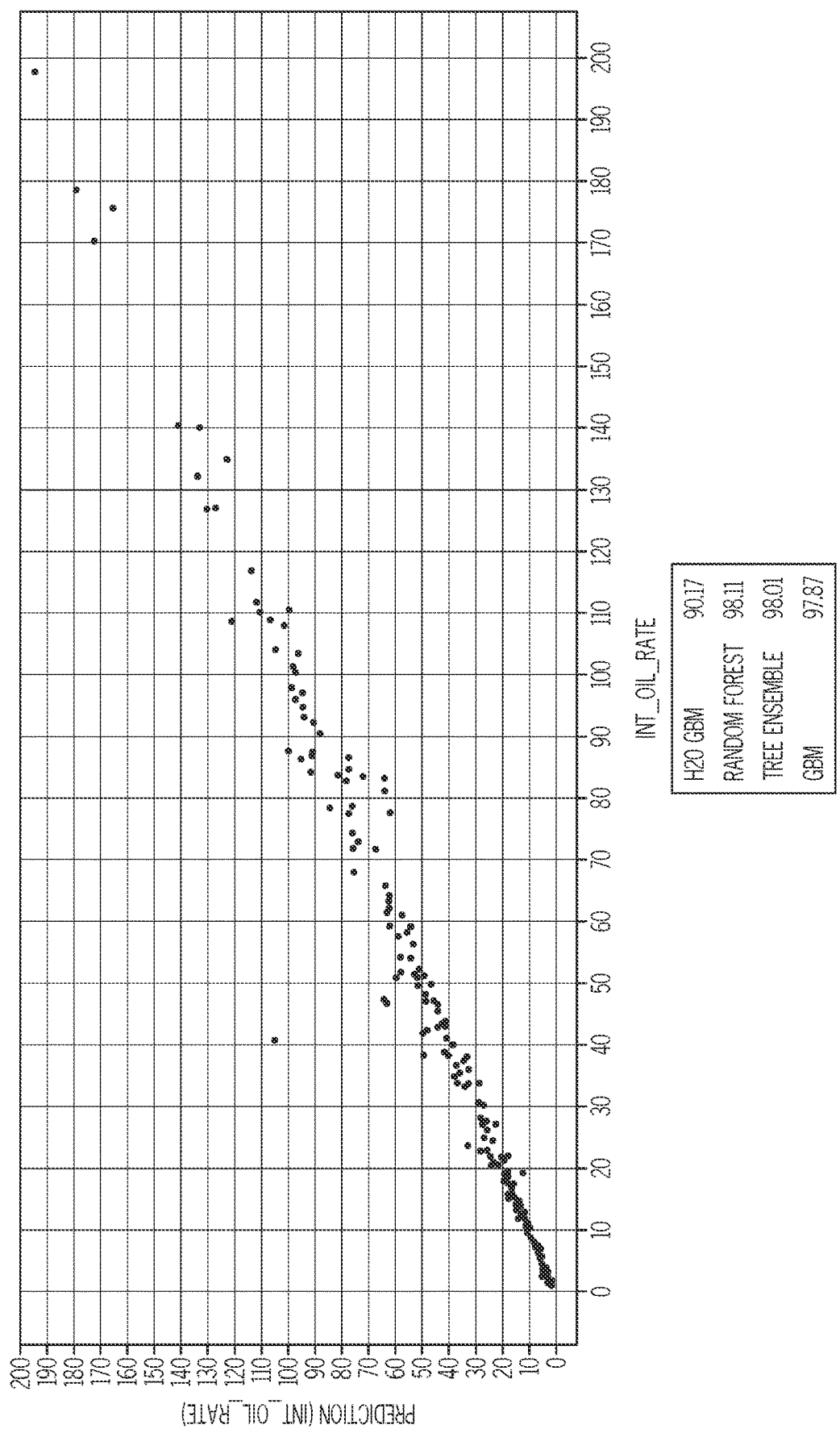
FIG. 6 schematically depicts a graphical representation of actual oil rates and predicted oil rates at perforated intervals of the an example subset of an example plurality of vertical wells, according to one or more embodiments described and illustrated herein.

FIG. 6 schematically depicts a graphical representation of actual oil rates and predicted oil rates at perforated intervals of an example subset of an example plurality of vertical wells, according to one or more embodiments described and illustrated herein.

In particular, the graphical representation depicted in FIG. 6 plots actual oil flow values (e.g., flow rates) of vertical wells on the x-axis and predicted oil flow values of the same wells on the y-axis. It is noted that, just as described in FIG. 5, the model is trained on various machine learning algorithms (e.g., H2O GBM, Random Forest, Tree Ensemble, and GBM). The oil flow value predictions of a model that is trained on each of these algorithms is depicted in FIG. 6. As show, the accuracy of the model is fairly high, ranging from 97.87% to 98.17%. When trained on the GBM algorithm, the model has the lowest accuracy level—approximately in the range of 97.87%. When trained on the H2O GBM algorithm, the model has the highest accuracy level—approximately in the range of 98.17%. Training the model on the Random Forest and Tree Ensemble algorithms provides accuracy levels in the range of 98.11% and 98.01%, respectively.

Upon completion of the machine learning based training of the model, the computing device 104 may generate a merged data table by merging the well completions data included in the historical data with the well rate tests data and flow meters data included therein. In particular, this table includes data that associates well completion data associated with each interval of the plurality of intervals of a different or additional plurality of wells (e.g., a second plurality of wells). The second plurality of wells may be in a particular field that is separate from the plurality of wells previously discussed (e.g., the first plurality of wells). Additionally, production data for perforated intervals (e.g., additional perforated intervals) of these wells may not be readily available. As such, the use of the machine learning trained model to predict oil flow values for perforated intervals of the second plurality of wells would help determine productivity levels of these wells.

After merging of the well completions data with the well rate tests data, the computing device 104 corresponds additional fluid flow values and additional rock quality values to the well rate tests data of the second plurality of wells included in the merged data table. These fluid flow values and rock quality values are accessible in the merged table, which includes the historical well completions data, flow meters data, and well rate tests data. As previously stated, the well completion data includes data related to, e.g., casing, cementing, perforating, gravel packing, and so forth, and well rate tests data may include data describing total liquid flow rates, flow well head pressure values, and so forth.

Thereafter, in embodiments, the computing device 104 may determine contribution fraction values for each perforated interval of each well of the second plurality of wells (e.g., additional plurality of wells). Specifically, the computing device 104 may determine an interval flow value for each perforated interval, determine a total flow value for each well of the second plurality of wells, and then divide each interval flow value of each interval of each well by the total flow value of the well that has the interval. In this way, a fractional flow amount (i.e. contribution fraction value) of each perforated interval of each well in the second plurality of wells is determined by the computing device 104.

In step 150, the computing device 104 may be configured to predict (for the surface rate test) oil flow values at perforated intervals of a plurality of target wells. In embodiments, the target wells may be installed in a reservoir that is separate and distinct from the one or more reservoirs in which the plurality of wells and the second plurality of wells are installed. Alternatively, the plurality of target wells may be a set of one or more wells that are included in the second plurality of wells for which production data, oil flow data, and so forth may not be available at a particular time.

The computing device 104 may utilize the model that is trained using machine learning and the data in the merged table to predict oil flow values for each perforated interval of each well of the plurality of target wells and then generate a synthetic production log (e.g., a simulated production profile) based on the predicted oil flow values. These synthetic production logs will aid in the determination of the downhole productivity potential of the plurality of target wells over a certain time frame. Thereafter, the computing device 104 may, using a plurality of sensors (e.g., flow meters and so forth), obtain production data for the plurality of target wells, e.g., flow values, fluid flow values, and the like for the plurality of target wells. From this, the computing device 104 may generate a graphical representation depicting a comparison of the obtained production data and the predicted oil flow values, as depicted in FIG. 7.

Figure 7:
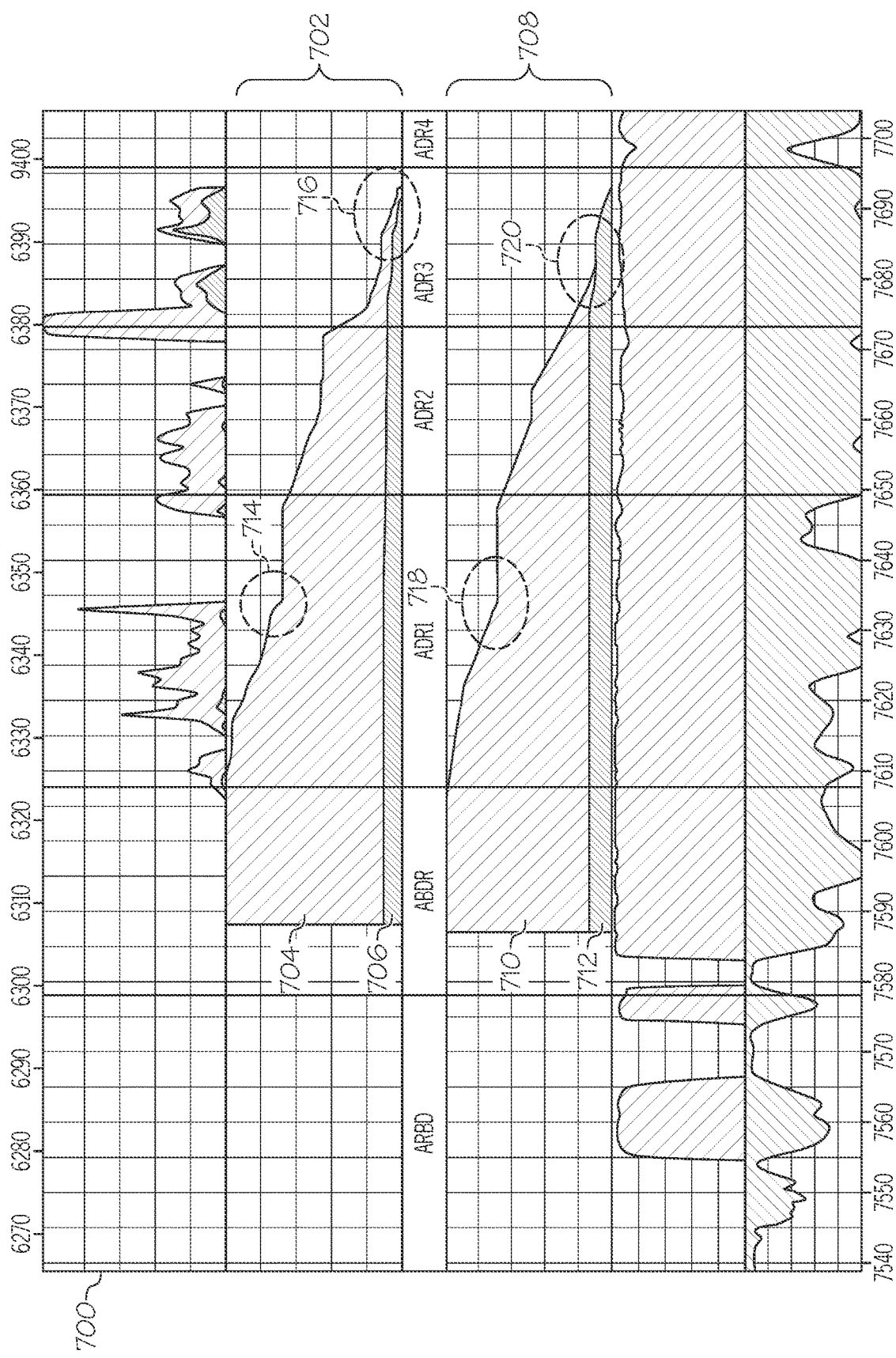
FIG. 7 schematically depicts a graphical representation of an example synthetic production log and an example actual production log of a plurality of example target wells, according to one or more embodiments described and illustrated herein.

FIG. 7 schematically depicts a graphical representation of an example synthetic production log and an example actual production log of a plurality of example target wells, according to one or more embodiments described and illustrated herein.

In particular, the synthetic production log 702 is depicted in the top portion of the graphical representation 700 and includes a synthetic production log 702 that has a predicted oil flow section 704 and a predicted water flow section 706. Additionally, the graphical representation 700 also includes an actual production log profile 708 that has an actual oil flow section 710 and actual water flow section 712. As depicted, the contours of the synthetic production log 702 and the actual production log profile 708 are substantially similar. While the differences between the predicted and the actual values are present, as indicated by a comparison of location 714 with location 718 and location 716 with location 720, these differences are not significant. As such, the computing device 104 may be able to predict, with a high level of accuracy, the oil flow values perforated intervals of a plurality of wells, thereby enabling the determination of the productivity potential of these wells without requiring the extensive resources that are needed to generate comprehensive production logs of wells (e.g., PLT studies).

Figure 8:
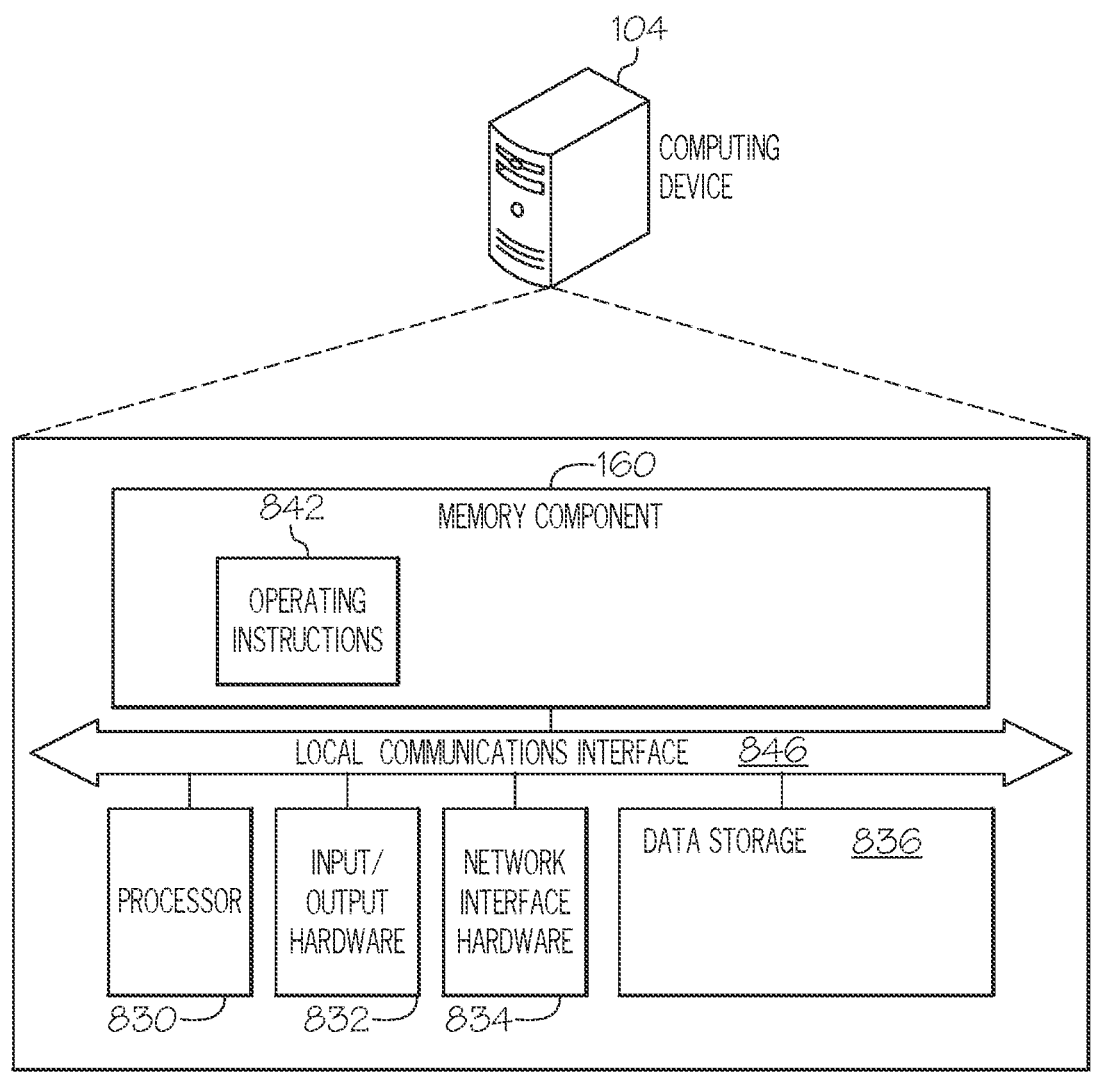
FIG. 8 schematically depicts a non-limiting example of a computing device configured to determine the synthetic production logs for perforated intervals of a plurality of logs, according to one or more embodiments described and illustrated herein.

FIG. 8 schematically depicts a non-limiting example of the computing device 104 configured to generate synthetic production logs that include a plurality of predicted oil flow values for perforated intervals of a plurality of logs, according to one or more embodiments described and illustrated herein. As illustrated, the computing device 104 includes a processor 830, input/output hardware 832, a network interface hardware 834, a data storage component 836, and a memory component 160. The memory component 160 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the computing device 104 and/or external to the computing device 104. It is noted that the memory component includes various types of data that may be accessed and temporarily stored therein, e.g., historical data that includes well production data, well completions data, flow meters data, well rate tests data, and historical reservoir properties data that includes fluid flow values data and rock quality index values.

The memory component 160 may store instructions 842, each of which may be embodied as a computer program, firmware, and so forth. A local interface 846 is also included in FIG. 8 and may be implemented as a bus or other communication interface to facilitate communication among the components of the computing device 104.

The processor 830 may include any processing component operable to receive and execute instructions 842 (such as from a data storage component 836 and/or the memory component 160). As described above, the input/output hardware 832 may include and/or be configured to interface with speakers, microphones, and/or other input/output components.

The network interface hardware 834 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the computing device 104 and other computing devices.

The instructions 842 may include an operating system and/or other software for managing components of the computing device 104. It should be understood that while the components in FIG. 8 are illustrated as residing within the computing device 104, this is merely an example. In some embodiments, one or more of the components may reside external to the computing device 104 or within other devices. It should also be understood that, while the computing device 104 is illustrated as a single device, this is also merely an example.

As an example, one or more of the functionalities and/or components described herein may be provided by the computing device 104. Depending on the particular embodiment, any of these devices may have similar components as those depicted in FIG. 8. To this end, any of these devices may include instructions for performing the functionality described herein.

Figure 9:
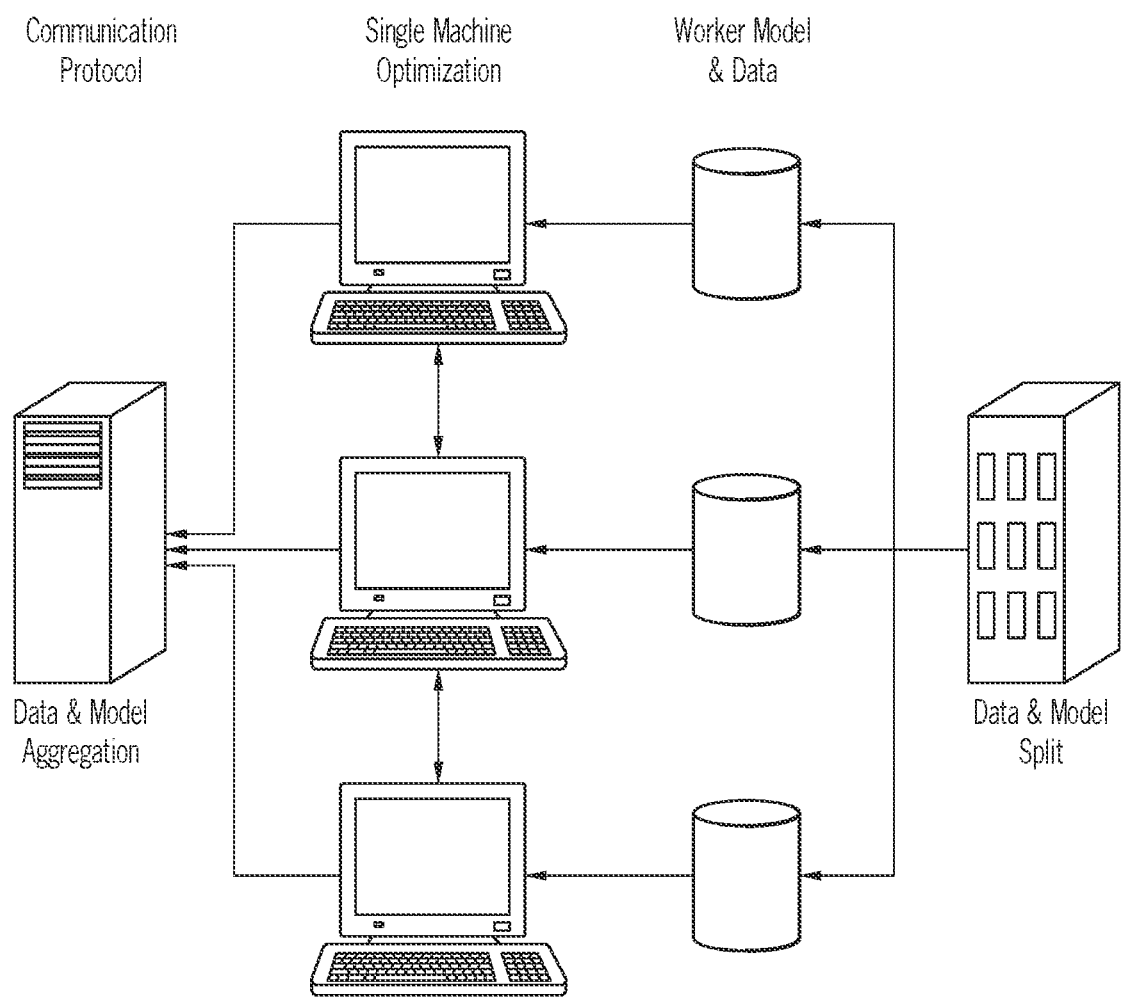
FIG. 9 schematically depicts an example component architecture that may be utilized to train the machine learning model of the present disclosure and utilize the trained machine learning model to predict oil flow rates at perforated intervals of a plurality of wells, according to one or more embodiments described and illustrated herein.

FIG. 9 schematically depicts an example distributed computing architecture that may be utilized to train the machine learning model of the present disclosure and utilize the trained machine learning model to predict oil flow rates at perforated intervals of a plurality of wells, according to one or more embodiments described and illustrated herein.

In particular, FIG. 9 depicts an example distributed computing architecture in which multiple computing devices, as shown under the "Single Machine Optimization" section may communicate with each other and perform one or more of the actions described in the present disclosure, including, e.g., the preparation of data, parsing and cleaning data, training the machine learning model, utilizing the trained machine learning model to predict oil flow values for various perforated intervals of a plurality of target wells (among other actions). It is further noted that the multiple computing devices depicted under the "Single Machine Optimization" section may perform the actions of partitioning the data set (e.g. input values as described above) into a training data set and a testing data set. In embodiments, the multiple computing devices may be used for data and model aggregation (which may involve the devices communicating via a designated communication protocol). Additionally, in embodiments the trained model may be used to predict oil flow rates on multiple computing devices.

It should now be understood that certain embodiments described herein are directed to a method for generating a synthetic production log that includes a plurality of predicted oil flow values. The method includes accessing, from a plurality of databases, historical data of a plurality of wells, the historical data including well production data, well completions data, flow meters data, and well rate tests data, accessing historical perforation data and historical reservoir properties data from a simulation model, and determining, using the historical perforated interval data and the historical reservoir properties data from the simulation model, fluid flow values and rock quality index values associated with perforated intervals of the plurality of wells. The method further includes corresponding the fluid flow values and rock quality values to the well production data included in the historical data of the plurality of wells for generating a plurality of input values, training, using the generated plurality of input values, a machine learning model for predicting oil flow values at perforated intervals of a plurality of target wells, and predicting, using the training machine learning model, the oil flow values at the perforated intervals of the plurality of target wells. Finally, the method includes generating a synthetic production log that includes the predicted oil flow values at the perforated intervals of the plurality of target wells.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method implemented by one or more computing devices, the method comprising:
    accessing historical data from a plurality of databases, the historical data including well production data of a plurality of wells, well completions data, flow meters data, and well rate tests data;
    accessing historical perforation data and historical reservoir properties data from a simulation model;
    training, using a plurality of input values, a machine learning model for predicting oil flow values at the perforated intervals of a plurality of target wells, wherein the plurality of input values comprise fluid flow values and rock quality index values associated with perforated intervals of the plurality of wells that are based at least in part on the historical perforation data and the historical reservoir properties data from the simulation model, and wherein the fluid flow values and rock quality values are linked to the well production data included in the historical data of the plurality of wells;
    predicting, using the trained machine learning model, the oil flow values at the perforated intervals of the plurality of target wells; and
    generating a synthetic production log that includes the oil flow values at the perforated intervals of the plurality of target wells.

2. The method of claim 1, wherein the simulation model corresponds to a reservoir simulation model.

3. The method of claim 1, wherein the historical reservoir properties data are associated with one or more of porosity values, permeability values, well geometry, rock classifications, and stratigraphic zone values.

4. The method of claim 1, wherein the perforated intervals of the plurality of wells and an additional plurality of wells are associated with a plurality of depth values such that each perforated interval is associated with a depth value of the plurality of depth values.

5. The method of claim 1, wherein the machine learning model is trained on one or more of a GBM algorithm, a random forest algorithm, a tree ensemble algorithm, and XGBoost algorithm.

6. The method of claim 1, further comprising:
    merging the well completions data included in the historical data with the well rate tests data included in the historical data for an additional plurality of wells;
    generating, based on the merging, a merged data table; and
    corresponding, using the merged data table, additional fluid flow values and additional rock quality values to the well rate tests data of the additional plurality of wells included in the merged data table.

7. The method of claim 6, further comprising determining contribution fraction values for additional perforated intervals of each of the additional plurality of wells.

8. The method of claim 7, wherein determining the contribution fraction values for the additional perforated intervals of each of the additional plurality of wells includes:
    determining an interval flow value for each of the additional perforated intervals of each of the additional plurality of wells; and
    determining a total flow value each of the additional perforated intervals of each of the additional plurality of wells.

9. The method of claim 8, further comprising dividing the interval flow value of each of the additional perforated intervals of each of the additional plurality of wells by the total flow value of each well that corresponds to each perforated interval.

10. A non-transitory computer-readable medium storing instructions that, when executed by one or more processors of a computing device, cause the computing device to:
- access historical data from a plurality of databases, the historical data including well production data of a plurality of wells, well completions data, flow meters data, and well rate tests data;
- access historical perforation data and historical reservoir properties data from a simulation model;
- train, using a plurality of input values, a machine learning model for predicting oil flow values at the perforated intervals of a plurality of target wells, wherein the plurality of input values comprise fluid flow values and rock quality index values associated with perforated intervals of the plurality of wells that are based at least in part on the historical perforation data and the historical reservoir properties data from the simulation model, and wherein the fluid flow values and rock quality values are linked to the well production data included in the historical data of the plurality of wells;
- predict, using the trained machine learning model, the oil flow values at the perforated intervals of the plurality of target wells; and
- generate a synthetic production log that includes the oil flow values at the perforated intervals of the plurality of target wells.

11. The non-transitory computer-readable medium of claim 10, wherein the simulation model corresponds to a reservoir simulation model.

12. The non-transitory computer-readable medium of claim 10, wherein the historical reservoir properties data are associated with one or more of porosity values, permeability values, well geometry, rock classifications, and stratigraphic zone values.

13. The non-transitory computer-readable medium of claim 10, wherein the perforated intervals are associated with a plurality of depth values such that each perforated interval is associated with a depth value of the plurality of depth values.

14. The non-transitory computer-readable medium of claim 10, wherein the machine learning model is trained on one or more of a GBM algorithm, a random forest algorithm, a tree ensemble algorithm, and XGBoost algorithm.

15. The non-transitory computer-readable medium of claim 10, wherein the stored instructions, when executed by the one or more processors of the computing device, further cause the computing device to:
- merge the well completions data included in the historical data with the well rate tests data included in the historical data for an additional plurality of wells;
- generate, based on the merging, a merged data table; and
- correspond, using the merged data table, additional fluid flow values and additional rock quality values to the well rate tests data of the additional plurality of wells included in the merged data table.

16. The non-transitory computer-readable medium of claim 15, wherein the stored instructions, when executed by the one or more processors of the computing device, further cause the computing device to determine contribution fraction values for additional perforated intervals of each of the additional plurality of wells.

17. The non-transitory computer-readable medium of claim 16, wherein the stored instructions, when executed by the one or more processors of the computing device, further cause the computing device to:
- determine an interval flow value for each of the additional perforated intervals of each of the additional plurality of wells; and
- determine a total flow value each of the additional perforated intervals of each of the additional plurality of wells.

18. The non-transitory computer-readable medium of claim 17, wherein the stored instructions, when executed by the one or more processors of the computing device, further cause the computing device to divide the interval flow value of each of the additional perforated intervals of each of the additional plurality of wells by the total flow value of each well that corresponds to each perforated interval.

19. A method implemented by one or more computing devices, the method comprising:
- accessing historical data from a plurality of databases, the historical data including well production data of a plurality of wells, well completions data, flow meters data, and well rate tests data;
- accessing historical perforation data and historical reservoir properties data from a simulation model;
- training, using a plurality of input values, a machine learning model for predicting oil flow values at the perforated intervals of a plurality of target wells, wherein the plurality of input values comprise fluid flow values and rock quality index values associated with perforated intervals of the plurality of wells that are based at least in part on the historical perforation data and the historical reservoir properties data from the simulation model, and wherein the fluid flow values and rock quality values are linked to the well production data included in the historical data of the plurality of wells; and
- predicting, using the trained machine learning model, the oil flow values at the perforated intervals of the plurality of target wells.

20. The method of claim 19, further comprising generating a synthetic production log that includes the oil flow values at the perforated intervals of the plurality of target wells.

* * * * *